US010654494B2

(12) United States Patent
Tashiro et al.

(10) Patent No.: US 10,654,494 B2
(45) Date of Patent: May 19, 2020

(54) VEHICLE AIR-CONDITIONING DEVICE AND TRAIN COMMUNICATION SYSTEM

(71) Applicant: MITSUBISHI ELECTRIC CORPORATION, Chiyoda-ku, Tokyo (JP)

(72) Inventors: Yusuke Tashiro, Tokyo (JP); Mamoru Hamada, Tokyo (JP); Yasutaka Ochiai, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 16/095,581

(22) PCT Filed: Jun. 10, 2016

(86) PCT No.: PCT/JP2016/067340
§ 371 (c)(1),
(2) Date: Oct. 22, 2018

(87) PCT Pub. No.: WO2017/212629
PCT Pub. Date: Dec. 14, 2017

(65) Prior Publication Data
US 2019/0126949 A1 May 2, 2019

(51) Int. Cl.
*F25D 15/00* (2006.01)
*B61D 27/00* (2006.01)
(Continued)

(52) U.S. Cl.
CPC ......... *B61D 27/00* (2013.01); *B60H 1/00371* (2013.01); *B60H 1/00771* (2013.01);
(Continued)

(58) Field of Classification Search
USPC ........................................................ 702/182
See application file for complete search history.

(56) References Cited

U.S. PATENT DOCUMENTS 6,318,097 B1 * 11/2001 Wieszt ............... B60H 1/00978
62/126
8,947,531 B2 * 2/2015 Fischer ................... G01S 7/003
348/148
(Continued)

FOREIGN PATENT DOCUMENTS

EP 2 457 797 A1 5/2012
JP 2005132167 A 5/2005
(Continued)

OTHER PUBLICATIONS

International Search Report (PCT/ISA/210) dated Jul. 12, 2016, by the Japan Patent Office as the International Searching Authority for International Application No. PCT/JP2016/067340.
(Continued)

*Primary Examiner* — Masud Ahmed
(74) *Attorney, Agent, or Firm* — Buchanan Ingersoll & Rooney PC

(57) ABSTRACT

A vehicle air-conditioning apparatus includes a refrigeration cycle that performs air-conditioning in a vehicle interior of a vehicle; a controller that includes a plurality of operation modes with different continuous operation times for a compressor, and that selects one operation mode from among the plurality of operation modes according to an air-conditioning load in the vehicle interior and executes the one operation mode, during travel operation of the vehicle; a storage unit; and a fault diagnosis unit. The fault diagnosis unit performs, during travel operation of the vehicle, fault diagnosis for the refrigeration cycle, after the high-load operation mode from among the plurality of operation modes, in which the continuous operation time is equal to or longer than a time that is set in advance is selected and executed by the controller at the timing stored in advance in the storage unit and while the refrigeration cycle is stable.

7 Claims, 7 Drawing Sheets

(51) Int. Cl.
  *F25B 49/02* (2006.01)
  *B60H 1/00* (2006.01)
  *B60H 1/32* (2006.01)
  *B61L 15/00* (2006.01)

(52) U.S. Cl.
  CPC ....... *B60H 1/00978* (2013.01); *B60H 1/3205* (2013.01); *B60H 1/3225* (2013.01); *B61D 27/0018* (2013.01); *B61L 15/0018* (2013.01); *B61L 15/0063* (2013.01); *B61L 15/0081* (2013.01); *F25B 49/02* (2013.01); *B60H 1/00657* (2013.01)

(56) References Cited

U.S. PATENT DOCUMENTS

| | | | |
|---|---|---|---|
| 9,121,407 B2* | 9/2015 | Pham | F04C 28/00 |
| 9,285,802 B2* | 3/2016 | Arensmeier | G05B 23/0224 |
| 2004/0210419 A1* | 10/2004 | Wiebe | F25B 49/005 |
| | | | 702/182 |
| 2007/0283713 A1* | 12/2007 | Masselus | B60L 1/003 |
| | | | 62/331 |
| 2014/0238060 A1* | 8/2014 | Tamaki | F25B 49/00 |
| | | | 62/127 |

FOREIGN PATENT DOCUMENTS

| | | |
|---|---|---|
| JP | 2008-082654 A | 4/2008 |
| JP | 2014230353 A | 12/2014 |
| KR | 101497048 B1 | 2/2015 |

OTHER PUBLICATIONS

Written Opinion (PCT/ISA/237) dated Jul. 12, 2016, by the Japan Patent Office as the International Searching Authority for International Application No. PCT/JP2016/067340.

Extended European Search Report dated May 29, 2019, issued by the European Patent Office in corresponding European Application No. 16904663.8. (8 pages).

Office Action dated Nov. 15, 2019, by the Chinese Patent Office in corresponding Chinese Patent Application No. 201680086440.0 and English translation of the Office Action. (13 pages).

* cited by examiner (A) FIRST OPERATION MODE     (A1) OPERATING RATE OF 25%

COMPRESSOR 3a (B) SECOND OPERATION MODE     (B1) OPERATING RATE OF 50%

COMPRESSOR 3a (C) THIRD OPERATION MODE     (C1) OPERATING RATE OF 75%

COMPRESSOR 3a (D) FOURTH OPERATION MODE     (D1) OPERATING RATE OF 100%

COMPRESSOR 3a

VEHICLE AIR-CONDITIONING DEVICE AND TRAIN COMMUNICATION SYSTEM

TECHNICAL FIELD

The present invention relates to a vehicle air-conditioning apparatus and a train communication system, and more particularly, to fault diagnosis for the vehicle air-conditioning apparatus.

BACKGROUND ART

A vehicle air-conditioning apparatus that includes a refrigeration cycle including a compressor, a condenser, a pressure reducing device and an evaporator, and that performs fault diagnosis on appliances configuring the refrigeration cycle is conventionally used (for example, see Patent Literature 1). In Patent Literature 1, deterioration of the evaporator is determined first thing in the morning before a vehicle leaves a shed or before an air cooling season starts, based on sensor detection values detected by a pressure sensor and a temperature sensor installed in the vehicle air-conditioning apparatus.

CITATION LIST

Patent Literature

Patent Literature 1: Japanese Unexamined Patent Application Publication No. 2005-132167

SUMMARY OF INVENTION

Technical Problem

In Patent Literature 1, fault diagnosis is performed before travel operation of the vehicle, and performing the fault diagnosis during travel operation of the vehicle is not considered. The vehicle air-conditioning apparatus is installed in the vehicle, and is thus used in an environment where a fault easily occurs in an appliance due to application of vibration or due to being used in an environment where ventilation is not sufficient, such as in a tunnel. Accordingly, to detect a fault at an early stage, fault diagnosis is desired to be performed during travel operation of the vehicle.

The vehicle air-conditioning apparatus is installed in the vehicle, and thus moves from a first station to a terminal station, through regions with different temperature environments, and also, the number of boarding and disembarking passengers varies depending on a stop. Accordingly, an air-conditioning load in a vehicle interior is easily changed, and operation of the refrigeration cycle is also varied according to the change. The sensor detection values also vary while operation of the refrigeration cycle is changing, and accurate fault diagnosis is difficult. Accordingly, there is a demand to perform fault diagnosis at a timing when the refrigeration cycle is stabilized, and development of a vehicle air-conditioning apparatus that is capable of handling such a demand is desired.

The present invention has been made in view of such circumstances, and has its object to provide a vehicle air-conditioning apparatus and a train communication system that are capable of performing fault diagnosis during travel operation of a vehicle, at a timing suitable for fault diagnosis.

Solution to Problem

A vehicle air-conditioning apparatus according to one embodiment of the present invention includes a refrigeration cycle that includes a compressor, a first heat exchanger, a pressure reducing device and a second heat exchanger, and that performs air-conditioning in a vehicle interior of a vehicle; a controller that includes a plurality of operation modes with different continuous operation times for the compressor, and that selects one operation mode from among the plurality of operation modes according to an air-conditioning load in the vehicle interior and executes the one operation mode, during travel operation of the vehicle; a storage unit that stores in advance a timing of selecting, from among the plurality of operation modes, a high-load operation mode in which the continuous operation time is equal to or longer than a time that is set in advance, and of executing the high-load operation mode; and a fault diagnosis unit that performs, during travel operation of the vehicle, fault diagnosis for the refrigeration cycle, after the high-load operation mode is selected and executed by the controller at the timing stored in the storage unit and while the refrigeration cycle is stable.

A train communication system according to another embodiment of the present invention includes a plurality of vehicle air-conditioning apparatuses described above; and a ground system that is communicably connected to the plurality of vehicle air-conditioning apparatuses, where the plurality of vehicle air-conditioning apparatuses each include a first communication unit that transmits a diagnosis result of the fault diagnosis unit to the ground system, and the ground system includes a second communication unit that receives the diagnosis result that is transmitted from the first communication unit of each of the plurality of vehicle air-conditioning apparatuses, and a storage unit that stores the diagnosis result that is received by the second communication unit.

Advantageous Effects of Invention

According to the embodiments of the present invention, fault diagnosis can be performed during travel operation of a vehicle, at a timing suitable for fault diagnosis.

DESCRIPTION OF EMBODIMENTS

Embodiment 1

(Refrigerant Circuit Configuration)

Figure 1:
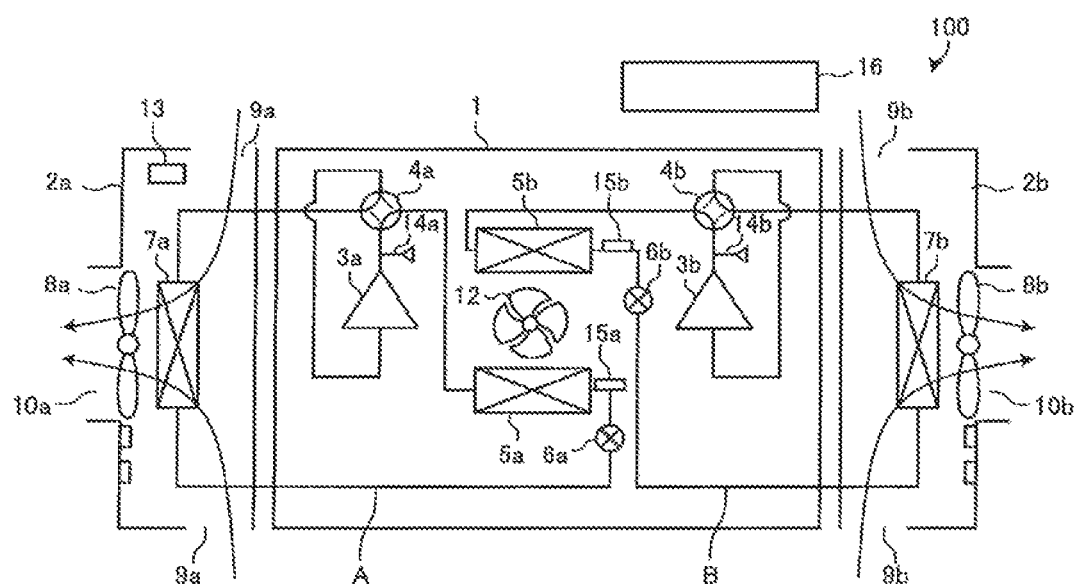
FIG. 1 is a refrigerant circuit diagram of a vehicle air-conditioning apparatus according to Embodiment 1 of the present invention.
Figure 2:
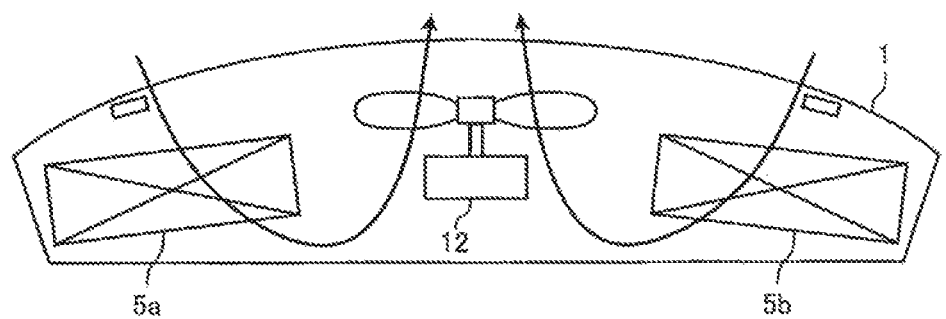
FIG. 2 is a schematic cross-sectional view of an outdoor unit in FIG. 1.
Figure 3:
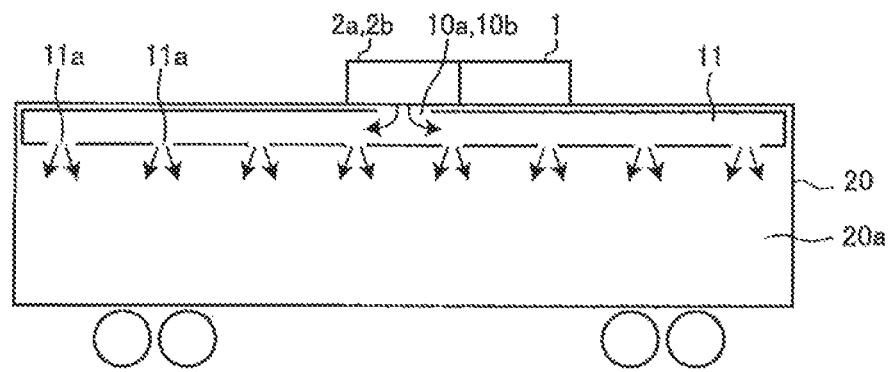
FIG. 3 is a schematic diagram of a state in which the vehicle air-conditioning apparatus in FIG. 1 is installed in a vehicle.

FIG. 1 is a refrigerant circuit diagram of a vehicle air-conditioning apparatus according to Embodiment 1 of the present invention. FIG. 2 is a schematic cross-sectional view of an outdoor unit in FIG. 1. FIG. 3 is a schematic diagram of a state in which the vehicle air-conditioning apparatus in FIG. 1 is installed in a vehicle. In FIGS. 1 to 3 and following drawings, elements denoted by a same reference sign are the same or equivalent elements, and this applies throughout the entire specification.

A vehicle air-conditioning apparatus 100 according to Embodiment 1 is an air-conditioning appliance installed in a vehicle 20, such as a high-speed rail vehicle, and includes an outdoor unit 1 and indoor units 2a, 2b. The vehicle air-conditioning apparatus 100 configures, by appliances provided in the outdoor unit 1 and the indoor units 2a, 2b, a refrigeration cycle A and a refrigeration cycle B for air-conditioning a same vehicle interior 20a. The vehicle air-conditioning apparatus 100 includes two independent refrigeration cycles A, B, and is configured with redundancy so that even if a fault occurs in the refrigeration cycle A, air-conditioning can be continuously performed by the refrigeration cycle B.

The refrigeration cycle A includes a compressor 3a, a four-way valve 4a, a first heat exchanger 5a, an expansion valve 6a, and a second heat exchanger 7a, which are connected in such an order by pipes to allow circulation of refrigerant. The refrigeration cycle A is configured to be able to switch operation modes of air-cooling operation and air-heating operation, by switching, by the four-way valve 4a, a passage of refrigerant that is discharged from the compressor 3a. The indoor unit 2a, where a part of the refrigeration cycle A is provided, includes the second heat exchanger 7a, an indoor fan 8a, an air inlet 9a for taking air in the vehicle interior into the indoor unit 2a, and a discharge port 10a for discharging air, a temperature of which is adjusted inside the indoor unit 2a, to outside the indoor unit 2a.

The refrigeration cycle B includes a compressor 3b, a four-way valve 4b, a first heat exchanger 5b, an expansion valve 6b, and a second heat exchanger 7b, which are connected in such an order by pipes to allow circulation of refrigerant. The refrigeration cycle B is configured to be able to switch operation modes of air-cooling operation and air-heating operation, by switching, by the four-way valve 4b, a passage of refrigerant that is discharged from the compressor 3b. The indoor unit 2b, where a part of the refrigeration cycle B is provided, includes the second heat exchanger 7b, an indoor fan 8b, an air inlet 9b for taking air in the vehicle interior into the indoor unit 2b, and a discharge port 10b for discharging air, a temperature of which is adjusted inside the indoor unit 2b, to outside the indoor unit 2b.

The outdoor unit 1 also includes first heat exchangers 5a, 5b, and an outdoor fan 12 for sending outside air to the first heat exchangers 5a, 5b. As indicated by arrows in FIG. 2, the outdoor unit 1 takes in outside air from above by the outdoor fan 12, and discharges air upward to outside the vehicle through the first heat exchangers 5a, 5b.

An air intake port (not show) is provided on a ceiling inside the vehicle interior 20a, at both ends in a vehicle width direction, and a plurality of air outlets 11a are formed in a vehicle length direction while being spaced apart. Air in the vehicle interior 20a is taken into a duct space 11 above the ceiling from the air intake port (not shown), and the air taken into the duct space 11 is sucked into the indoor unit 2a, 2b from the air inlet 9a, 9b. Then, the air sucked into the indoor units 2a, 2b is discharged from the discharge port 10a, 10b into the duct space 11 after having the temperatures adjusted at the second heat exchangers 7a, 7b, and is blown into the vehicle interior 20a from the air outlets 11a.

(Sensor Configuration)

An inlet air temperature sensor 13 for detecting a temperature of air inside the vehicle interior 20a is provided in the indoor unit 2a. Additionally, in FIG. 1, the air inlet 9a of the indoor unit 2a and the air inlet 9b of the indoor unit 2b are shown to be separate from each other, but FIG. 1 is merely for describing the refrigerant circuit, and does not show accurate arrangement positions. An inlet air temperature detected by the inlet air temperature sensor 13 provided in the indoor unit 2a is substantially the same as an inlet air temperature of air sucked into the indoor unit 2b.

The outdoor unit 1 also includes discharge pressure sensors 14a, 14b for detecting discharge pressures of the compressors 3a, 3b, and temperature sensors 15a, 15b. The temperature sensor 15a, 15b detects a refrigerant temperature between the first heat exchanger 5a, 5b and the expansion valve 6a, 6b.

The vehicle air-conditioning apparatus 100 further includes a controller 16. For example, the controller 16 is a microcomputer, and includes a CPU, a RAM and a ROM.

Figure 4:
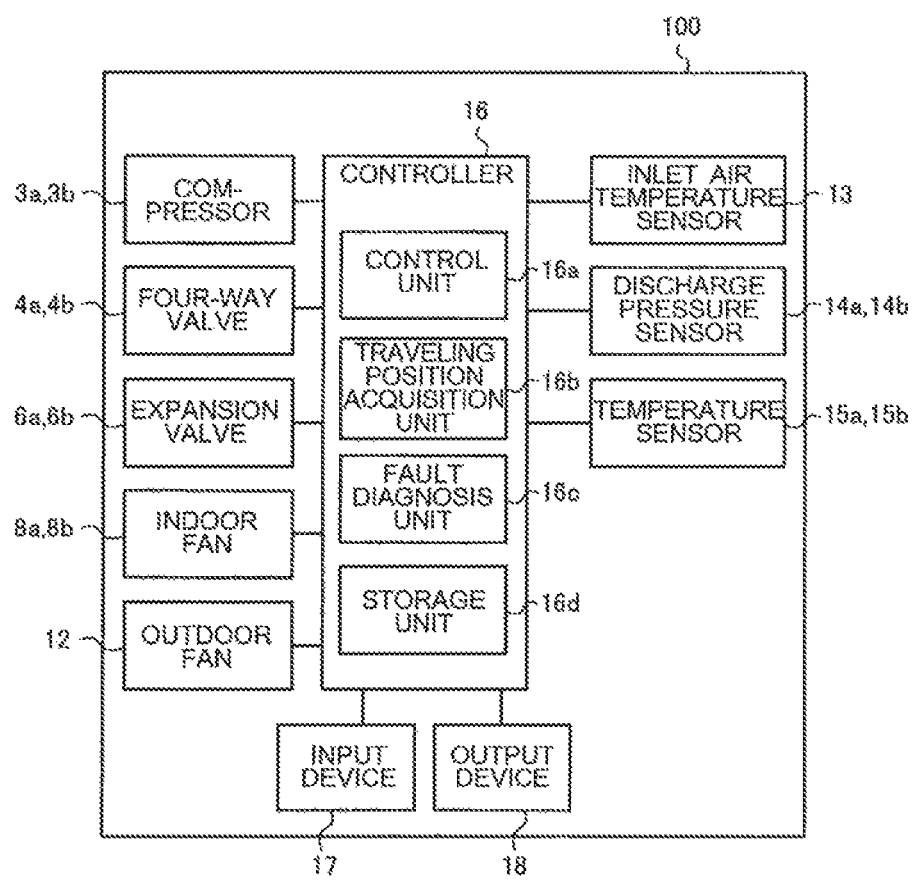
FIG. 4 is a control block diagram of the vehicle air-conditioning apparatus in FIG. 1.

FIG. 4 is a control block diagram of the vehicle air-conditioning apparatus in FIG. 1.

The controller 16 is electrically connected to each sensor, and is also electrically connected to each of the compressors 3a, 3b, the four-way valves 4a, 4b, the expansion valves 6a, 6b, the indoor fans 8a, 8b, and the outdoor fan 12 to thereby control operation of each unit. An input device 17 that is used to set a vehicle interior temperature and the like, and a display device 18, such as a liquid crystal panel, for displaying a fault diagnosis result and the like are also connected to the controller 16.

The controller 16 includes a controller 16a, a traveling position acquisition unit 16b, and a fault diagnosis unit 16c. Each function of the controller 16a, the traveling position acquisition unit 16b, and the fault diagnosis unit 16c may be configured by hardware such as a circuit device for realizing the function, or may be configured by an arithmetic device such as microcomputer or a CPU and software executed on the arithmetic device. The controller 16 also includes a storage unit 16d for storing a timing of performing fault diagnosis. The storage unit 16d is configured by a memory such as a ROM or a flash memory.

The controller 16a performs control of the entire vehicle air-conditioning apparatus 100, such as control regarding air cooling or air heating, and control of operation of the compressor. Details of control of operation of the compressors 3a, 3b will be given later.

The traveling position acquisition unit 16b acquires a current traveling position of the vehicle 20. In this case, a distance from a first station is acquired as the traveling position. An acquisition method of the traveling position by the traveling position acquisition unit 16b is not particularly limited, and acquisition may be performed based on longitude and latitude by using a GPS, for example.

The fault diagnosis unit 16c performs fault diagnosis on each refrigeration cycle A, B based on sensor detection values from the discharge pressure sensor 14a, 14b and the temperature sensor 15a, 15b. In this case, in the fault diagnosis, a refrigerant leak is detected based on a degree of subcooling. The degree of subcooling is determined by calculating a saturation conversion temperature from a discharge pressure detected by the discharge pressure sensor 14a, 14b, and subtracting a detection temperature detected by the temperature sensor 15a, 15b from the saturation conversion temperature. In the following, the discharge pressure sensor 14a, 14b and the temperature sensor 15a, 15b, which are sensors used for fault diagnosis, will be collectively referred to as fault diagnosis sensors. Fault diagnosis by the fault diagnosis unit 16c is not limited to a refrigerant leak based on the degree of subcooling, and may adopt a conventional technique.

In the following, examples of fault diagnosis items to be diagnosed by the fault diagnosis unit 16c, and conditions for determining presence of a fault will be described.

(1) Refrigerant Leak
  Reduction of the degree of subcooling to below a set degree of subcooling for refrigerant leak determination.
  Reduction of a parameter regarding the degree of subcooling, such as a temperature efficiency or exergy, to below a refrigerant leak determination parameter set in advance.
(2) Compressor Abnormality
  Increase of a discharge temperature to above a set discharge temperature for compressor abnormality determination.
  Increase of a compressor frequency to above a set frequency for compressor abnormality determination.
  Increase of a compressor input to above a set input for compressor abnormality determination.
(3) Expansion Valve Abnormality
  Increase of a degree of superheat at an evaporator outlet to above a set degree of superheat for abnormality detection.
  Reduction of an evaporation pressure to below a set evaporating temperature for abnormality detection.
(4) Reduction in Performance of Heat Exchanger (Deterioration Determination)
  Increase of a temperature difference between a refrigerant temperature and an ambient temperature to above a set temperature difference for abnormality determination.
  An increase in a fan input.

Next, operations of the refrigeration cycle in an air-cooling operation and an air-heating operation performed by the vehicle air-conditioning apparatus 100 will be described. Operation is the same for the refrigeration cycle A and the refrigeration cycle B, and in the following, operation of the refrigeration cycle A will be described.

(Air-Cooling Operation)

In the air-cooling operation, the four-way valve 4a is switched to a side indicated by solid lines in FIG. 1. At the vehicle air-conditioning apparatus 100, in the air-cooling operation, refrigerant compressed by the compressor 3a flows into the first heat exchanger 5a through the four-way valve 4a. The refrigerant flowing into the first heat exchanger 5a is cooled due to heat exchange with an outdoor air sent in by the outdoor fan 12. Then, the refrigerant expands due to pressure reduction at the expansion valve 6a. The refrigerant after pressure reduction at the expansion valve 6a is heated at the second heat exchanger 7a due to heat exchange with an indoor air sent in by the indoor fan 8a, and flows into the compressor 3a, and one cycle is thereby completed. The cycle described above is continuously repeated, and the vehicle interior 20a is thereby cooled.

(Air-Heating Operation)

In the air-heating operation, the four-way valve 4a is switched to a side indicated by dotted lines in FIG. 1. At the vehicle air-conditioning apparatus 100, in the air-heating operation, refrigerant compressed by the compressor 3a flows into the second heat exchanger 7a through the four-way valve 4a. The refrigerant flowing into the second heat exchanger 7a is cooled due to heat exchange with an indoor air sent in by the indoor fan 8a. Then, the refrigerant expands due to pressure reduction at the expansion valve 6a. The refrigerant after pressure reduction at the expansion valve 6a is heated at the first heat exchanger 5a due to heat exchange with an outdoor air sent in by the outdoor fan 12, and flows into the compressor 3a, and one cycle is thereby completed. The cycle described above is continuously repeated, and the vehicle interior 20a is thereby heated.

Next, control of the compressor 3a, 3b will be described.

As described above, the vehicle air-conditioning apparatus 100 performs air-conditioning in one vehicle interior 20a by using two refrigeration cycles A, B, and the controller 16a controls each compressor 3a, 3b such that the vehicle interior 20a is maintained at a set temperature. Each compressor 3a, 3b is a constant speed compressor, and to perform air-conditioning according to an air-conditioning load, air-conditioning performance is adjusted by intermittently operating each compressor 3a, 3b. Specifically, the controller 16a includes four operation modes with different continuous operation times with respect to the compressor 3a, 3b, and performs control of selecting and executing, during travel operation of the vehicle 20, one of the four operation modes according to the air-conditioning load for the vehicle interior 20a.

Figure 5:
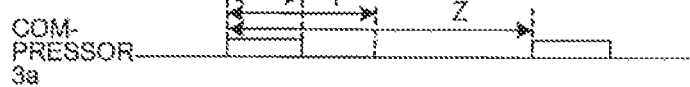
FIG. 5 is an explanatory diagram of operation modes of the vehicle air-conditioning apparatus according to Embodiment 1 of the present invention.
Figure 5:
Figure 5:
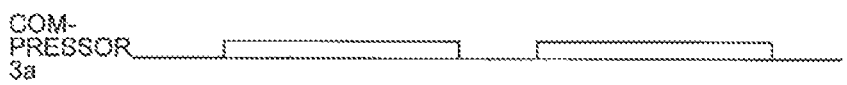
Figure 5:

FIG. 5 is an explanatory diagram of operation modes of the vehicle air-conditioning apparatus according to Embodiment 1 of the present invention.

As described above, the continuous operation time of the compressor 3a, 3b is different in each operation mode, and the continuous operation time is more increased as the air-conditioning load is more increased. FIG. 5 shows only the compressor 3a, but the compressors 3a, 3b both perform intermittent operation with the same continuous operation time but with shifted operation start timings. Taking a first operation mode as an example, the compressors 3a, 3b are intermittently operated, in a cycle of Z seconds, with the same continuous operation time of X seconds, but with the operation start timings shifted from each other by Y seconds.

The four operation modes are further divided into a plurality of operating rate patterns with different operating rates with respect to the compressor. For the sake of simplicity, in FIG. 5, one operating rate pattern is provided for one operation mode. The operating rate of the compressor is a proportion of the continuous operation time X to the operation cycle Z, which is a time from previous operation start of the compressor 3a, 3b to next operation start of the compressor 3a, 3b. In this case, a first operation is "(A1) operating rate of 25%", a second operation mode is "(B1) operating rate of 50%", a third operation is "(C1) operating rate of 75%" and a fourth operation is "(D1) operating rate of 100%".

In this case, there is one operating rate for one operation mode, but a plurality of operating rate patterns may be provided for one operation mode in the following manner. That is, the operation cycle is set shorter than Z seconds with the continuous operation time still being X seconds, and in the case of the first operation mode, an operating rate higher than 25%, such as 35%, may be provided as another operating rate pattern in the first operation mode.

Next, a concept of an appropriate fault diagnosis timing for the vehicle air-conditioning apparatus 100 of Embodiment 1 will be described. In the following, an example for air-cooling operation will be described. In the case where the refrigeration cycle A and the refrigeration cycle B are not particularly distinguished from each other, a term "refrigeration cycle" will be used.

With the vehicle air-conditioning apparatus 100, when the operating rate is less than 100%, the compressor 3a, 3b is intermittently operated, and since the continuous operation time is short in the first operation mode, operation is ended before the refrigeration cycle reaches a stable state. At the time of start of the compressor, the values of the fault diagnosis sensors are not stable, and accurate fault diagnosis is not performed. Accordingly, fault diagnosis has to be performed using detection values of the fault diagnosis sensors obtained after a transient operation at the time of start is completed and the refrigeration cycle is stabilized.

Specifically, for example, in the case where an amount of refrigerant filled in the refrigeration cycle is 4.0 kg, and a flow rate is 500 kg/h, a time constant is about 30 seconds. A time taken from start of the compressor 3a, 3b until refrigerant is spread through the refrigeration cycle and the refrigeration cycle is stabilized is about six times the time constant, and is about three minutes. Accordingly, to perform an accurate fault diagnosis, the diagnosis has to be performed at a timing after three or more minutes of continuous operation of the compressor 3a, 3b. In other words, the fault diagnosis is to be performed in the case where the air-conditioning load is relatively high, and an operation mode in which the continuous operation time is three or more minutes is selected from the four operation modes.

In this case, of the four operation modes of the compressor 3a, 3b, the third and the fourth operation modes are modes in which the continuous operation time is three or more minutes. Accordingly, fault diagnosis may be performed when the compressor 3a, 3b is operated in the third or the fourth operation mode (hereinafter referred to as "high-load operation mode").

With the vehicle air-conditioning apparatus 100, that the compressor 3a, 3b is to operate in the high-load operation mode at a specific timing during travel operation can be grasped in advance. For example, arrival of the vehicle 20 at a stop may be cited as an example. In this case, when the vehicle 20 arrives at a stop and doors are opened, air outside the vehicle flows into the vehicle interior 20a where air-cooling is being performed, and the temperature in the vehicle interior 20a is increased and the air-conditioning load is increased. Accordingly, an air-conditioning schedule is set at the vehicle air-conditioning apparatus 100 such that operation is performed in the high-load operation mode at the time of arrival of the vehicle 20 at a stop. Additionally, which operating pattern in the high-load operation mode is to be used in setting the air-conditioning schedule can be arbitrarily set. For example, the operating rate pattern may be set to 100% for a hot day when an outside temperature exceeds 30 degrees C.

As described above, "after arrival at a stop", operation is performed in which the continuous operation time of the compressor 3a, 3b is three or more minutes, or in other words, at a timing allowing the refrigeration cycle to reach a stable operation state. Seen from another angle, "after arrival at a stop" can be said to be a timing suitable for fault diagnosis.

Accordingly, in Embodiment 1, a timing when the high-load operation mode in which the continuous operation time is three or more minutes is performed is stored in advance in the storage unit 16d. Setting of a timing in the storage unit 16d is performed based on a traveling position of the vehicle 20. Fault diagnosis is performed when the vehicle 20 arrives at the traveling position set in the storage unit 16d. Fault diagnosis may thus be performed during travel operation, at a timing suitable for fault diagnosis. In the example described above, position information of a stop is set in the storage unit 16d.

An example is described above where three minutes is required for the refrigeration cycle to be stabilized, but in the case of two minutes, a timing when an operation mode in which the continuous operation time is two or more minutes is selected is set in the storage unit 16d.

Furthermore, as timings to be stored in advance in the storage unit 16d, (1), (2) below may be additionally adopted.
(1) Advance Operation before Arriving at Stop The temperature in the vehicle interior 20a is known to increase when a stop is reached and doors are opened, due to air outside the vehicle entering the vehicle interior 20a. Accordingly, the vehicle air-conditioning apparatus 100 performs advance operation of operating in the high-load operation mode, by increasing the air-conditioning performance before the vehicle stops at a stop. Accordingly, a position obtained by subtracting a set distance from a travel distance to a certain stop may be registered in advance in the storage unit 16d.
(2) Time of High Boarding Rate after Departure from Station For example, in homecoming holidays, such as Bon holiday, a boarding rate can be predicted to increase at specific stations. Accordingly, with the vehicle air-conditioning apparatus 100, the controller 16a is to perform control such that the high-load operation mode is executed after boarding and disembarking of passengers at a specific station are completed, doors are closed, and the vehicle leaves the station. Therefore, a timing after departure of a vehicle from a stop where the boarding rate is predicted to be higher than a boarding rate set in advance may be registered. Specifically, a travel position corresponding to such a timing is obtained as a travel distance from a first station to the specific stop.

The number of times of fault diagnosis during a day's travel operation is not particularly limited, and it may be arbitrarily set, such as once a day or upon arrival at specific stations where the number of boarding and disembarking passengers is great.

Next, normal air-conditioning control operation by the vehicle air-conditioning apparatus 100 performed during travel operation will be described.

The controller 16a detects a temperature difference between an inlet air temperature detected by the inlet air temperature sensor 13 and a set temperature of the vehicle interior 20a as an air-conditioning load, and determines the operating rate of the compressor 3a, 3b based on the air-conditioning load. Specifically, the air-conditioning load is divided into four stages, and the four operating rate patterns (A1), (B1), (C1), (D1) are associated with the stages in an ascending order, and are stored in the storage unit 16d. For example, "(A1) operating rate of 25%" is selected when the air-conditioning load is at the lowest stage, and intermittent operation is performed in which each of the compressors 3a, 3b is continuously operated for X seconds in a cycle of Z seconds, with operation start timings shifted by Y seconds between the compressor 3a and the compressor 3b.

Additionally, there are four operating rate patterns in this case, but in the case where there are seven, for example, the air-conditioning load is divided into seven stages, and seven operating rate patterns are associated with the stages in an ascending order, and are stored in the storage unit 16*d*.

The vehicle air-conditioning apparatus 100 performs the air-conditioning control described above during travel operation of a train, and performs following fault diagnosis control in parallel with the air-conditioning control.

Next, operation of the vehicle air-conditioning apparatus 100 for fault diagnosis control will be described.

Figure 6:
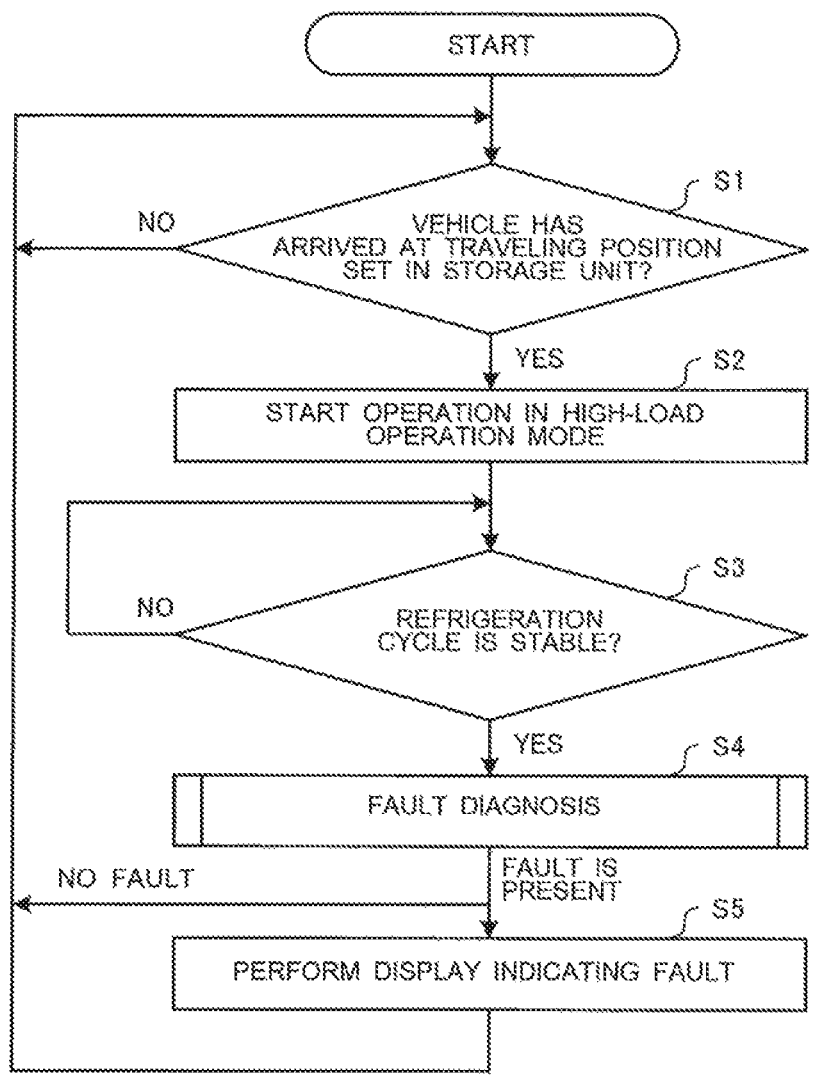
FIG. 6 is a diagram showing a flowchart of fault diagnosis control by the vehicle air-conditioning apparatus according to Embodiment 1 of the present invention.

FIG. 6 is a diagram showing a flowchart of fault diagnosis control by the vehicle air-conditioning apparatus according to Embodiment 1 of the present invention.

During the normal air-conditioning control described above, a current traveling position of the vehicle 20 is grasped by the controller 16*a* by using the traveling position acquisition unit 16*b*. When it is recognized that a traveling position set in the storage unit 16*d* is reached (step S1), the controller 16*a* stops control that is based on an operating rate pattern according to the air-conditioning load, and starts operation of the compressor 3*a*, 3*b* in a high-load operation mode set in advance (step S2). Then, the controller 16*a* determines whether the refrigeration cycle is stabilized or not (step S3), and after determining that the refrigeration cycle is stabilized, a fault diagnosis process is performed by the fault diagnosis unit 16*c* (step S4). The fault diagnosis process will be described with reference to a flowchart in FIG. 7.

A manner of determining whether the refrigeration cycle is stabilized or not is not particularly limited, but for example, the refrigeration cycle may be determined as stabilized, after a lapse of three minutes after the compressor 3*a*, 3*b* is started. Alternatively, stabilization of the refrigeration cycle may be determined when variation widths of the sensor detection values of the fault diagnosis sensors become smaller than predetermined values, for example. In the case of diagnosis indicating presence of a fault, the controller 16*a* causes the display device 18 to perform display to the effect that a fault is present. In the case of diagnosis indicating absence of a fault, the process returns to step S1.

Figure 7:
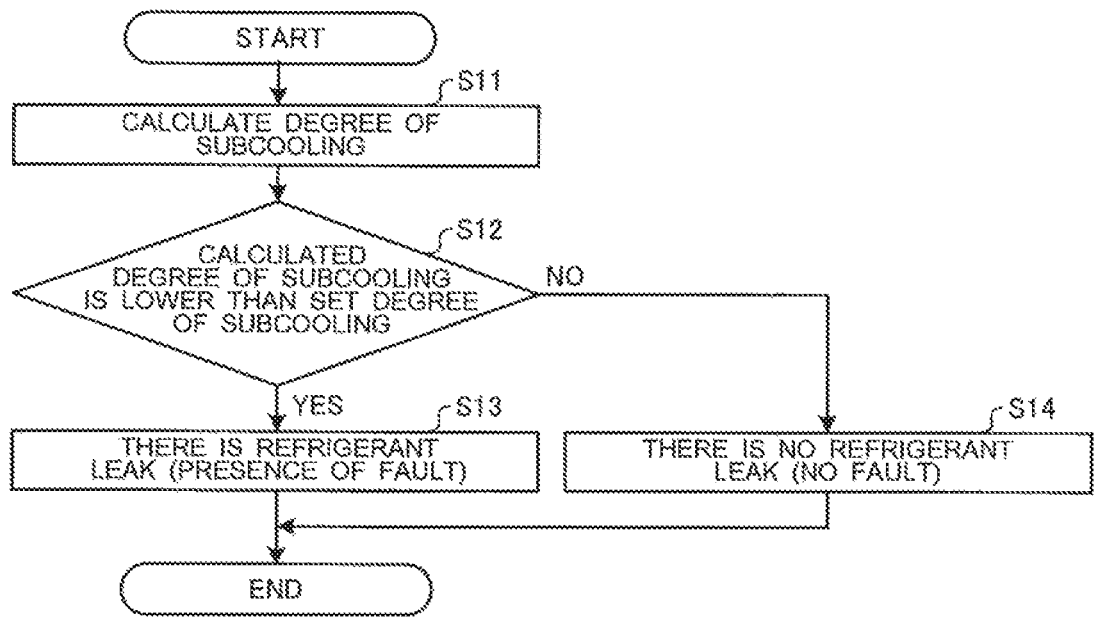
FIG. 7 is a diagram showing a flowchart of a fault diagnosis process in FIG. 6.

FIG. 7 is a diagram showing a flowchart of the fault diagnosis process in FIG. 6. The fault diagnosis process is performed for each of the refrigeration cycle A and the refrigeration cycle B. The fault diagnosis process is the same between the refrigeration cycle A and the refrigeration cycle B, and thus, a description is given below with respect to the refrigeration cycle A.

The fault diagnosis unit 16*c* calculates the degree of subcooling of the refrigeration cycle A from the sensor detection value of each of the discharge pressure sensor 14*a* and the temperature sensor 15*a*, which are the fault diagnosis sensors (step S11). In the case where the calculated degree of subcooling is lower than a set degree of subcooling set in advance for refrigerant leak diagnosis (step S12), it is diagnosed that there is a refrigerant leak (presence of fault) (step S13). On the other hand, in the case where the calculated degree of subcooling is equal to or higher than the set degree of subcooling, it is diagnosed that there is no refrigerant leak (no fault) (step S14).

As described above, according to Embodiment 1, fault diagnosis is performed at a timing that is set in advance, and thus, fault diagnosis can be performed at a timing suitable for fault diagnosis even during vehicle travel operation, and fault diagnosis can be performed with high accuracy.

With respect to a railroad vehicle, there are locations where a fault easily occurs in an appliance due to application of great vibration, or locations where a filter is easily clogged due to insufficient ventilation, such as in a tunnel. Accordingly, in the case of obtaining a fault diagnosis result once a day, and of checking deterioration of an appliance from a record of fault diagnosis results, it is desirable to use the fault diagnosis result that is obtained every day at a same timing after a location where a trouble is easily caused is passed. In Embodiment 1, fault diagnosis is performed at a timing determined in advance, and a diagnosis result may be obtained every day at a same timing, and this is suitable to grasp progress of deterioration of an appliance and a sign of a fault. As a result, a maintenance period may be made clear, and failure of an appliance may be suppressed.

A dynamic process for determining a timing when the refrigeration cycle is stabilized is not necessary during travel operation, and a computational load on the controller 16 can be reduced.

In Embodiment 1, the compressor is a constant speed compressor, but this is not restrictive, and the present invention is also applicable to an inverter compressor.

Operation of the vehicle air-conditioning apparatus 100 after a fault diagnosis result is obtained is not particularly limited, but the following operation is conceivable. For example, operation may be performed by changing the operating rate of each of the compressors 3*a*, 3*b*; in a case where an appliance in the refrigeration cycle A is deteriorated, the refrigeration cycle A may be operated at the operating rate of 25%, and the refrigeration cycle B may be operated at the operating rate of 75%.

The temperature difference between the inlet air temperature detected by the inlet air temperature sensor 13 and the set temperature of the vehicle interior 20*a* is given as the air-conditioning load, but a humidity difference between inlet humidity and set humidity may be used instead.

Specific numerical values of the amount of refrigerant, the flow rate, the time, the operating rate and the like cited above are merely examples, and the values may be arbitrarily set according to actual use conditions, for example.

The number of operation modes is given as four, but this is not restrictive, and the continuous operation time may be further divided to obtain an increased number of operation modes, or three or less operation modes may be used instead.

FIG. 1 shows an example where there are two refrigeration cycles, but the number of refrigeration cycles may be one or three or more. Same advantageous effects can be obtained also in such a case.

A description is given above citing a case of air-cooling operation as an example, but the description also applies to air-heating operation.

The configuration of the vehicle air-conditioning apparatus of the present invention is not limited to the configuration shown in FIG. 1, and various modifications and embodiments as described below may be made without departing from the scope of the present embodiment. Same advantageous effects may be obtained also by the following configuration.

Figure 8:
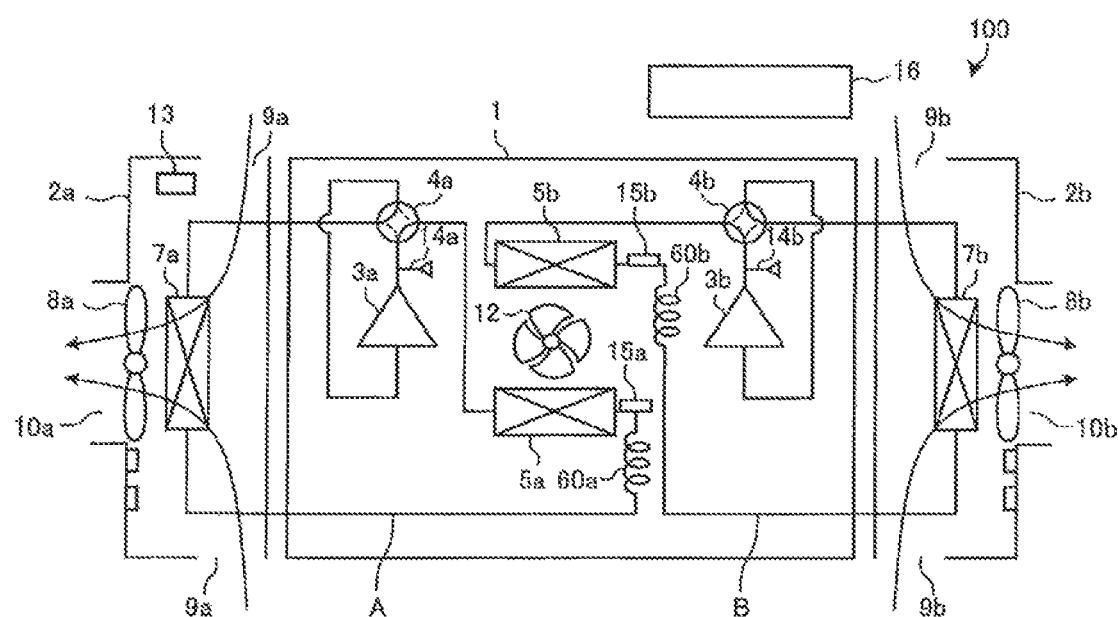
FIG. 8 is a diagram showing a modification of the vehicle air-conditioning apparatus according to Embodiment 1 of the present invention.

FIG. 8 is a diagram showing a modification of the vehicle air-conditioning apparatus according to Embodiment 1 of the present invention.

FIG. 1 shows a configuration where the expansion valves 6*a*, 6*b* are used as pressure reducing devices, but capillary tubes 60*a*, 60*b* may be used instead, as shown in FIG. 8.

Figure 9:
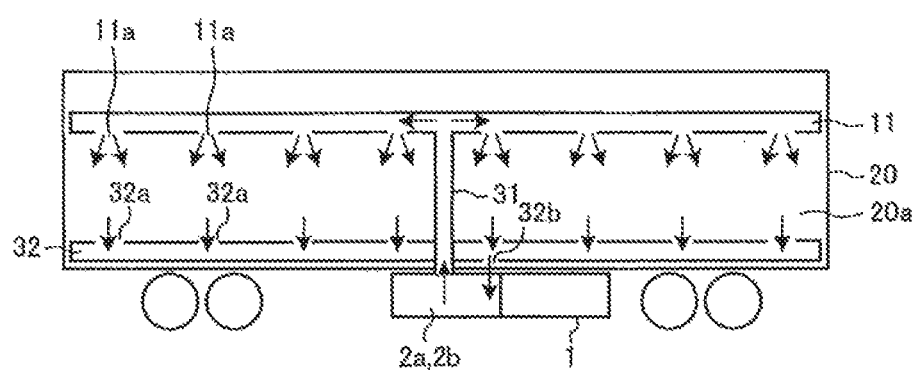
FIG. 9 is a diagram showing a modification regarding an arrangement position of the vehicle air-conditioning apparatus according to Embodiment 1 of the present invention.

FIG. 9 is a diagram showing a modification regarding an arrangement position of the vehicle air-conditioning apparatus according to Embodiment 1 of the present invention.

In FIG. 1, the vehicle air-conditioning apparatus 100 is a roof-mounted type which is arranged above a ceiling, but an underfloor type which is arranged underfloor, as shown in FIG. 9, is also possible. With the underfloor type, the vehicle air-conditioning apparatus 100 is arranged underfloor, and air discharged from the indoor unit 2a, 2b is guided by a duct 31 to the duct space 11 above the ceiling, and is blown into the vehicle interior 20a from the air outlets 11a. Air inside the vehicle interior 20a is sucked into a duct space 32 underfloor from a plurality of air inlets 32a that are formed in a floor while being spaced apart in the vehicle length direction, and is returned to the indoor unit 2a, 2b through a discharge port 32b.

Embodiment 2

Embodiment 1 describes a configuration where the vehicle air-conditioning apparatus 100 operates by itself, but Embodiment 2 is related to a train communication system that connects the vehicle air-conditioning apparatus 100 and a ground system through a communication network. In the following, aspects of Embodiment 2 different from Embodiment 1 will be mainly described. Modifications that are applied to structural elements of Embodiment 1 are also applicable to same structural elements of Embodiment 2.

Figure 10:
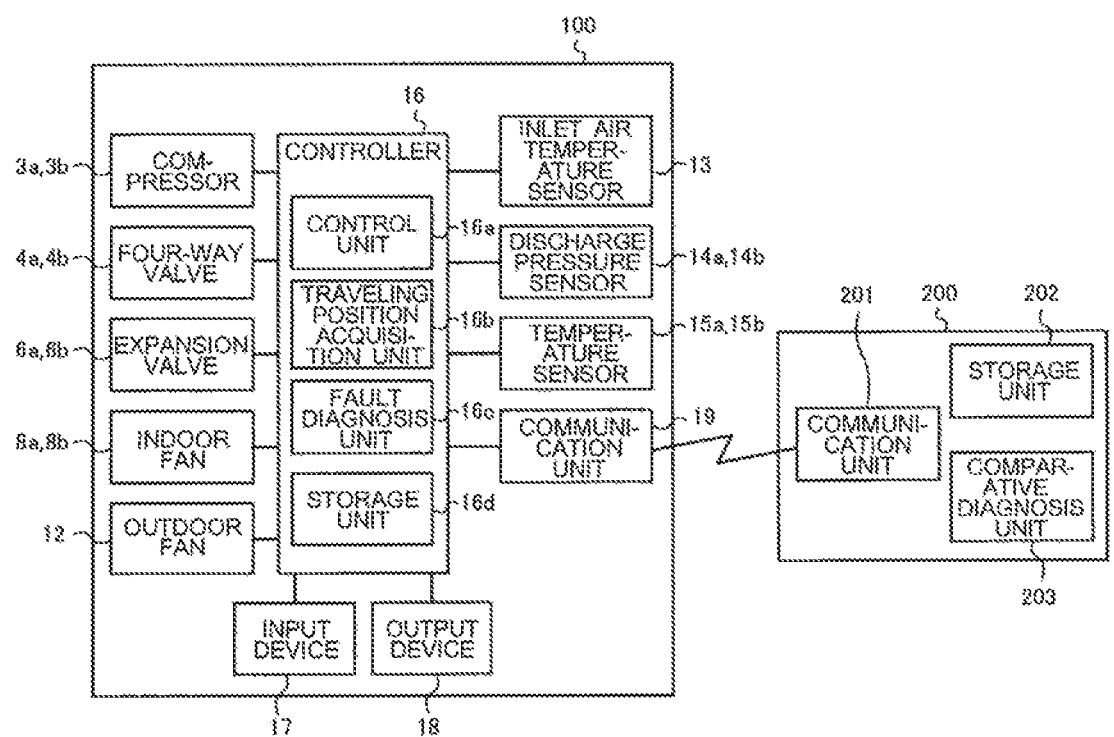
FIG. 10 is a diagram showing an example configuration of a train communication system according to Embodiment 2 of the present invention.

FIG. 10 is a diagram showing an example configuration of the train communication system according to Embodiment 2 of the present invention.

The train communication system includes a plurality of vehicle air-conditioning apparatuses 100 of Embodiment 1, and a ground system 200 that is communicably connected to the vehicle air-conditioning apparatuses 100 through a communication network. The plurality of vehicle air-conditioning apparatuses 100 are installed in different vehicle interiors 20a of one vehicle 20, or are installed in respective vehicles 20 operating on a same line, for example.

In addition to the structural elements of Embodiment 1, the vehicle air-conditioning apparatus 100 includes a communication unit 19 for transmitting a diagnosis result from the fault diagnosis unit 16c to the ground system 200. A function of the communication unit 19 may be configured by hardware such as a circuit device for realizing the function, or may be configured by an arithmetic device such as a microcomputer or a CPU and software executed on the arithmetic device. The communication unit 19 is a first communication unit of the present invention.

The ground system 200 includes a communication unit 201 for receiving a diagnosis result transmitted from the vehicle air-conditioning apparatus 100, a storage unit 202 for storing the diagnosis result received by the communication unit 201, and a comparative diagnosis unit 203. Each function of the communication unit 201 and the comparative diagnosis unit 203 may be configured by hardware such as a circuit device for realizing the function, or may be configured by an arithmetic device such as microcomputer or a CPU and software executed on the arithmetic device. The communication unit 201 is a second communication unit of the present invention. The storage unit 202 is configured by a memory such as a ROM or a flash memory.

The comparative diagnosis unit 203 performs, according to an algorithm determined in advance, comparative diagnosis of a plurality of diagnosis results from a plurality of vehicle air-conditioning apparatuses 100. A diagnosis result is stored in the storage unit 202, and is used at the time of maintenance that is performed another day, for example. With respect to comparative diagnosis, for example, travel operation diagrams may be compared against one another by using diagnosis results from the vehicle air-conditioning apparatuses 100 installed on the vehicles 20 operating on a same line. By comparing the diagnosis results between travel operation diagrams, comparison may be performed under similar environmental conditions (outdoor air temperature, traveling state), and thus, comparison may be performed with respect to refrigerant leak, compressor abnormality, expansion valve abnormality, and reduction in performance of the heat exchanger (deterioration determination).

As described above, according to Embodiment 2, same advantageous effects as those of Embodiment 1 may be obtained, and also, the following advantageous effect is obtained by collecting diagnosis results from a plurality of vehicle air-conditioning apparatuses 100 by the ground system 200. Specifically, diagnosis results from a plurality of vehicle air-conditioning apparatuses 100 may be compared against one another. Accordingly, for example, comparative diagnosis may be performed by comparing diagnosis results for travel operation diagrams for a same line, and a wider range of diagnosis is enabled.

REFERENCE SIGNS LIST 1 outdoor unit 2a indoor unit 2b indoor unit 3a compressor 3b compressor 4a four-way valve 4b four-way valve 5a first heat exchanger 5b first heat exchanger 6a expansion valve 6b expansion valve 7a second heat exchanger 7b second heat exchanger 8a indoor fan 8b indoor fan 9a air inlet 9b air inlet 10a discharge port 10b discharge port 11 duct space 11a air outlet 12 outdoor fan 13 inlet air temperature sensor 14a discharge pressure sensor 14b discharge pressure sensor 15a temperature sensor 15b temperature sensor 16 controller 16a controller 16b traveling position acquisition unit 16c fault diagnosis unit 16d storage unit input device 18 display device 19 communication unit vehicle 20a vehicle interior 31 duct 32 duct space 32a air inlet 32b discharge port 60a capillary tube 60b capillary tube 100 vehicle air-conditioning apparatus 200 ground system 201 communication unit 202 storage unit 203 comparative diagnosis unit A refrigeration cycle B refrigeration cycle

The invention claimed is:
1. A vehicle air-conditioning apparatus comprising:
a refrigeration cycle including a compressor, a first heat exchanger, a pressure reducing device and a second heat exchanger, and configured to perform air-conditioning in a vehicle interior of a vehicle;
a controller configured to execute a plurality of operation modes with different continuous operation times for the compressor, and configured to select one operation mode from among the plurality of operation modes according to an air-conditioning load in the vehicle interior and executes the one operation mode, during travel operation of the vehicle;
a storage unit configured to store in advance a timing of selecting, from among the plurality of operation modes, a high-load operation mode, the high-load operation mode having the continuous operation time equal to or longer than a time that is set in advance, and the controller configured to select and execute the high-load operation mode at the timing stored in the storage unit; and
a fault diagnosis unit configured to perform, during travel operation of the vehicle, fault diagnosis for the refrigeration cycle, after the high-load operation mode is selected and executed by the controller at the timing stored in the storage unit and while the refrigeration cycle is stable.

2. The vehicle air-conditioning apparatus of claim 1, comprising a traveling position acquisition unit configured to acquire a current traveling position of the vehicle, wherein the storage unit stores, as the timing, a traveling position of the vehicle, and the fault diagnosis unit performs fault diagnosis after the current traveling position of the vehicle acquired by the traveling position acquisition unit reaches the traveling position stored in the storage unit and while the refrigeration cycle is stable.

3. The vehicle air-conditioning apparatus of claim 1, wherein the plurality of operation modes are further divided into a plurality of operating rate patterns with different operating rates, and the controller is configured to select one operating rate pattern from among the plurality of operating rate patterns according to the air-conditioning load, and execute the one operating rate pattern.

4. The vehicle air-conditioning apparatus of claim 1, wherein the timing that is stored in the storage unit is at least one of after departure of the vehicle and at a time of advance operation for increasing air-conditioning performance prior to arrival at a stop.

5. The vehicle air-conditioning apparatus of claim 1, wherein the time that is set in advance is set based on an amount of refrigerant and a flow rate in the refrigeration cycle.

6. A train communication system comprising:

a plurality of vehicle air-conditioning apparatuses of claim 1, and a ground system that is communicably connected to the plurality of vehicle air-conditioning apparatuses, wherein the plurality of vehicle air-conditioning apparatuses each include a first communication unit that transmits a diagnosis result of the fault diagnosis unit to the ground system, and the ground system includes a second communication unit that receives the diagnosis result that is transmitted from the first communication unit of each of the plurality of vehicle air-conditioning apparatuses, and a storage unit that stores the diagnosis result that is received by the second communication unit.

7. The train communication system of claim 6, wherein the ground system includes a comparative diagnosis unit that receives diagnosis results from the plurality of vehicle air-conditioning apparatuses installed in respective vehicles operating on a same line, and performs fault diagnosis by comparing the diagnosis results for travel operation diagrams for the same line.

* * * * *